June 26, 1928.
S. H. WOOSTER
PROPELLER
Filed Aug. 6, 1926
1,674,674
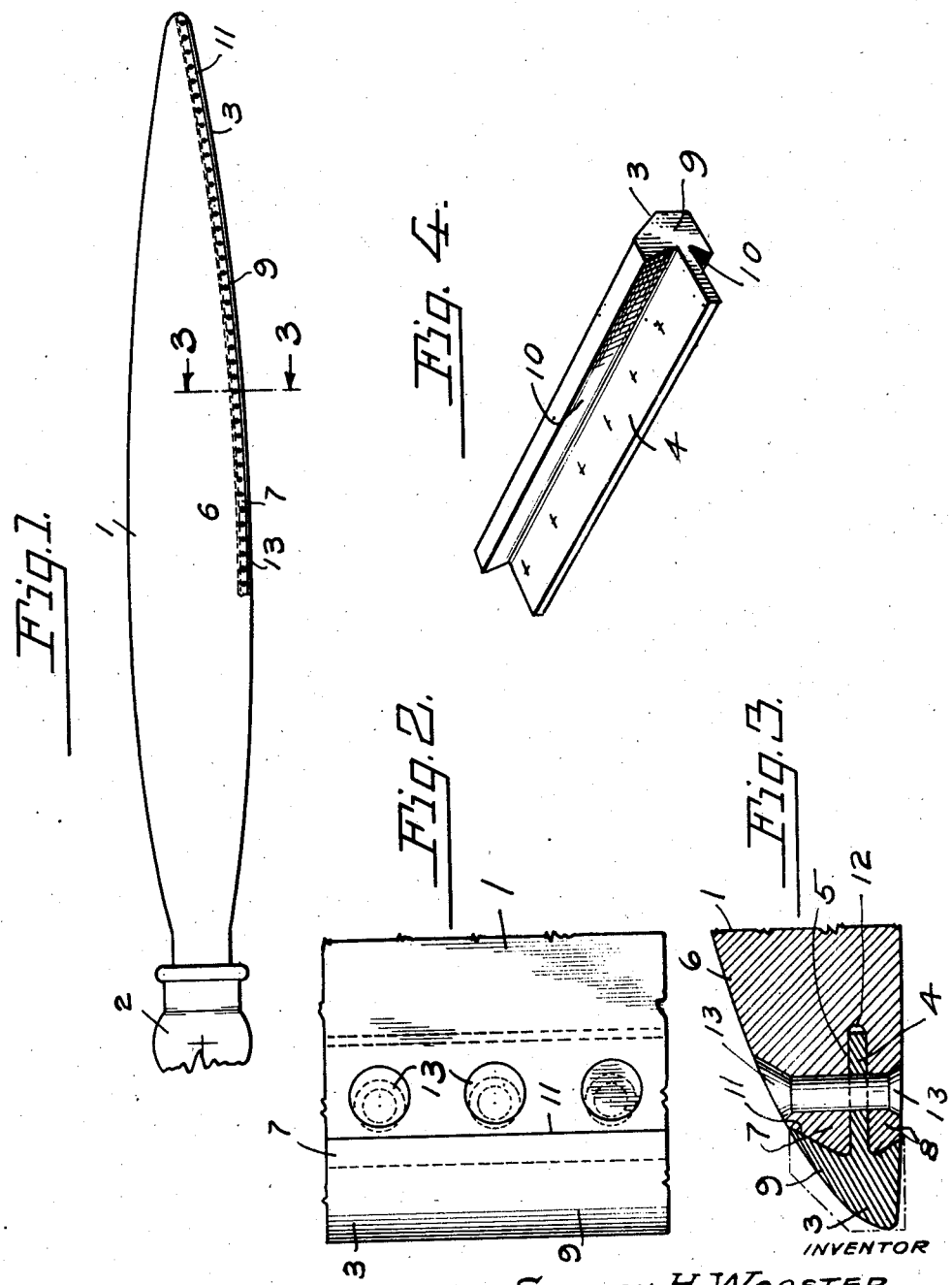
INVENTOR
STANTON H. WOOSTER,
BY
ATTORNEY

UNITED STATES PATENT OFFICE.

STANTON H. WOOSTER, OF WASHINGTON, DISTRICT OF COLUMBIA.

PROPELLER.

Application filed August 6, 1926. Serial No. 127,677.

My invention relates broadly to aircraft and more particularly to the propeller blades thereof.

An object of the invention is to provide a means of protection for the leading edges of propeller blades.

Another object is to provide a propeller blade with a wear resisting, non-rusting leading edge.

With the above and other objects in view, the invention consists in the construction, combination and arrangement of parts as will be hereinafter more fully described.

Reference is to be had to the accompanying drawings, in which like reference characters indicate corresponding parts throughout the several views, and in which Figure 1 is a plan view of a propeller blade showing my invention attached, Figure 2 is an enlarged fragmentary view of a portion of the blade, Figure 3 is a sectional view on the line 3—3 of Figure 1, and Figure 4 is a perspective view of the protecting means.

Referring more particularly to the drawings, the blade proper of an aircraft is indicated at 1 and is secured in a hub 2 in any well known manner. A wear resisting metal leading edge insert is indicated at 3, that is provided with a tongue 4 for insertion in a groove 5 formed in the leading edge 6 of the blade 1. In order to insure a positive fit that will overcome the tendency of lips 7 and 8 formed by the groove 5 to bulge, the enlarged portion 9 is undercut, as at 10, to correspond with a bevel in the cutaway portion 11 of the blade 1. As a further precaution, the groove 5 is rounded at the rear, as at 12, to prevent the metal from tearing. The tongue and groove joint thus formed is secured by countersunk rivets 13 as may be seen in Figure 3 of the drawings.

The metal wear resisting leading edge insert may be machined to the form shown in Figure 4, bent to conform to the contour of the blade, and afterwards ground down to the finished shape, or be finished to shape and afterwards inserted and riveted in place, as desired.

The length of this metal insert has been shown as extending along the leading edge from the tip to approximately the center of the blade, but it is merely illustrative, as conditions may arise where it would become necessary to extend the insert well toward the hub portion. This wear resisting leading edge may be made of stainless or non-rusting steel, hardened, tempered or merely untempered tough metal, according to the conditions and the use to which the propeller may be subjected.

It will be understood that the above description and accompanying drawings comprehend only the general and preferred embodiment of my invention and that minor details in construction, proportion and arrangement of parts may be made within the scope of the appended claim without sacrificing any of the advantages of my invention.

Having thus described my invention what I claim is:

An aircraft propeller including a hub, solid blades carried thereby, the leading edge of each of which is beveled and grooved, a wear resisting insert undercut to conform to the bevel of the leading-edge of the blade and provided with a tongue engaging in the groove, and means for securing the inserts to the blades.

STANTON H. WOOSTER.